(12) United States Patent
Sato et al.

(10) Patent No.: US 6,749,175 B2
(45) Date of Patent: Jun. 15, 2004

(54) SOLENOID FOR SOLENOID VALVE

(75) Inventors: Hideharu Sato, Tsukuba-gun (JP); Yoshio Aso, Tsukuba-gun (JP); Shinichi Yoshimura, Tsukuba-gun (JP); Takumi Matsumoto, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 44 days.

(21) Appl. No.: 10/211,540

(22) Filed: Aug. 5, 2002

(65) Prior Publication Data

US 2003/0030019 A1 Feb. 13, 2003

(30) Foreign Application Priority Data

Aug. 13, 2001 (JP) ..................................... 2001-245729

(51) Int. Cl.[7] ............................................... F16K 31/02
(52) U.S. Cl. ............................. 251/129.19; 251/129.15
(58) Field of Search ....................... 251/129.19, 129.15

(56) References Cited

U.S. PATENT DOCUMENTS

| 3,004,195 | A | | 10/1961 | Peras | |
| 4,339,109 | A | | 7/1982 | Kawata et al. | |
| 4,896,861 | A | * | 1/1990 | Kojima | 251/129.15 |
| 4,961,561 | A | * | 10/1990 | Kamibayasi | 251/129.15 |
| 5,143,345 | A | * | 9/1992 | Miki et al. | 251/129.15 |
| 5,746,412 | A | * | 5/1998 | Niimi | 251/129.15 |

FOREIGN PATENT DOCUMENTS

WO     WO 93/11370     6/1993

* cited by examiner

*Primary Examiner*—John Bastianelli
(74) *Attorney, Agent, or Firm*—Oblon, Spivak, McClelland, Maier & Neustadt, P.C.

(57) ABSTRACT

To make it possible to easily produce a solenoid for a solenoid valve at low cost by reducing the number of parts and assembling steps. In a solenoid for a solenoid valve, a pole face is formed on an end wall portion of a magnetic case which covers a bobbin around which a coil is wound, thereby allowing the end wall portion to function as a stationary core, an end surface of a moving core inserted in center holes of the bobbin and the magnetic plate is set opposed to the pole face, and the moving core is adsorbed by the end wall portion by energizing the coil.

5 Claims, 4 Drawing Sheets

SOLENOID FOR SOLENOID VALVE

TECHNICAL FIELD

The present invention relates to a solenoid for a solenoid valve mounted to a solenoid valve for driving a channel-switching valve member.

PRIOR ART

A solenoid valve 50 previously proposed by the present applicant shown in FIG. 4 comprises a valve portion 51 provided therein with a channel-switching valve member (not shown) and a solenoid portion 52 connected to the valve portion 51 for driving the valve member, and the valve member of the valve portion 51 is pushed by a push rod 60 and opened and closed.

The solenoid portion 52 is structured such that a cylindrical magnetic case 53 is provided at its one end with an opening to which the valve portion 51 is connected, a bobbin 55 having a coil 54 wound around an outer periphery of the bobbin 55, a magnetic plate 59 mounted to an opened end of the magnetic case 53, a stationary core 56 and a moving core 58 inserted into the magnetic plate 59 and the center hole of the bobbin 55 are assembled in the magnetic case 53. The stationary core 56 includes a flange portion 56a, and a core 56b having a pole face 56c. The core 56b is inserted through center holes of the magnetic plate 59 and the bobbin 55. The moving core 58 is slidably inserted into the center hole, one end of the moving core 58 is opposed to the pole face 56c, a cap 61 is press-fitted into the other end projecting from the center hole, the cap 61 is abutted against the push rod 60, and a reference portion of the cap 61 is provided with an abutting portion 61a which moves toward and away from the magnetic plate 59.

The cap 61 is provided at its outer periphery with a flange 61b, a return spring 57 is compressed between the flange 61b and the magnetic plate 59, thereby always biasing the moving core 58 in an abutting direction against the push rod 60, i.e., toward the valve portion 51.

In the solenoid valve 50 having such a structure, if the coil 54 of the solenoid portion 52 is energized, the moving core 58 is adsorbed by the pole face 56c of the stationary core 56 as shown in right half of FIG. 4, an abutting portion 61a of the cap 61 abuts against the magnetic plate 59 and stops. On the other hand, in a non-energized state, the moving core 58 moves away from the pole face 56c by the biasing force of the return spring 57 toward the valve portion 51 as shown in left half of FIG. 4, thereby pushing the magnetic plate 59, and associatively, the valve member is driven.

The solenoid portion 52 has the stationary core 56 of complicated shape comprising the flange portion 56a and the core 56b, but the present inventors made sure that it was unnecessary to especially provide such a stationary core having the complicated shape, and that sufficient magnetic attraction force could be exhibited to drive the moving core by a simple structure in which other member functions as the stationary core. If the solenoid portion is produced by this method, the number of parts can be reduced, the assembling process is simplified, and the producing cost can be reduced.

DISCLOSURE OF THE INVENTION

Thereupon, it is an object of the present invention to provide a solenoid for a solenoid valve capable of reducing the number of parts to simplify the assembling process and to reduce the producing cost by allowing other member to function as a stationary core.

To solve the achieve the above object, the present invention provides a solenoid for a solenoid valve mounted to a solenoid valve for driving a channel-switching valve member, wherein the solenoid comprises a non-magnetic bobbin having a center hole extending in a axial direction of the bobbin and wound around an outer periphery; a magnetic case having a side wall portion covering a side surface of the bobbin and an end wall portion integrally or separately formed on or from the side wall portion for covering one end surface of the bobbin in the axial direction and having substantially uniform thickness; an annular magnetic plate having a center hole coaxially connected to the center hole of the bobbin and connected to the magnetic case on the side of another end surface of the bobbin; and a moving core movably accommodated in the bobbin and the center hole of the magnetic plate; and wherein the end wall portion of the magnetic case also functions as a stationary core, a portion of the end wall portion covering the center hole of the bobbin is provided with a pole face for adsorbing the moving core.

In the present invention, the side wall portion and the end wall portion of the magnetic case may be integrally formed together, and they may have uniform thickness as a whole.

Alternatively, the side wall portion and the end wall portion of the magnetic case may be separately formed from each other and a thickness of the end wall portion may be greater than that of the side wall portion.

Further, an inner surface of the end wall portion of the magnetic case covering one end surface of the bobbin in the axial direction may be flat as a whole, or a portion of the end wall portion of the magnetic case covering the center hole of the bobbin may be provided with a cylindrical recess which is fitted into the center hole.

According to the solenoid of the present invention having the above structure, since a portion of the magnetic case also functions as the stationary core, it is unnecessary to provide a stationary core having the complicated shape unlike the prior art and thus, it is possible to drive the moving core by a stationary core having a simple structure. As a result, when the solenoid portion is produced, it is possible to reduce the number of parts, to simplify the assembling process, and to reduce the producing cost.

BRIEF DESCRIPTION OF THE INVENTION

DETAILED DESCRIPTION

Figure 1:
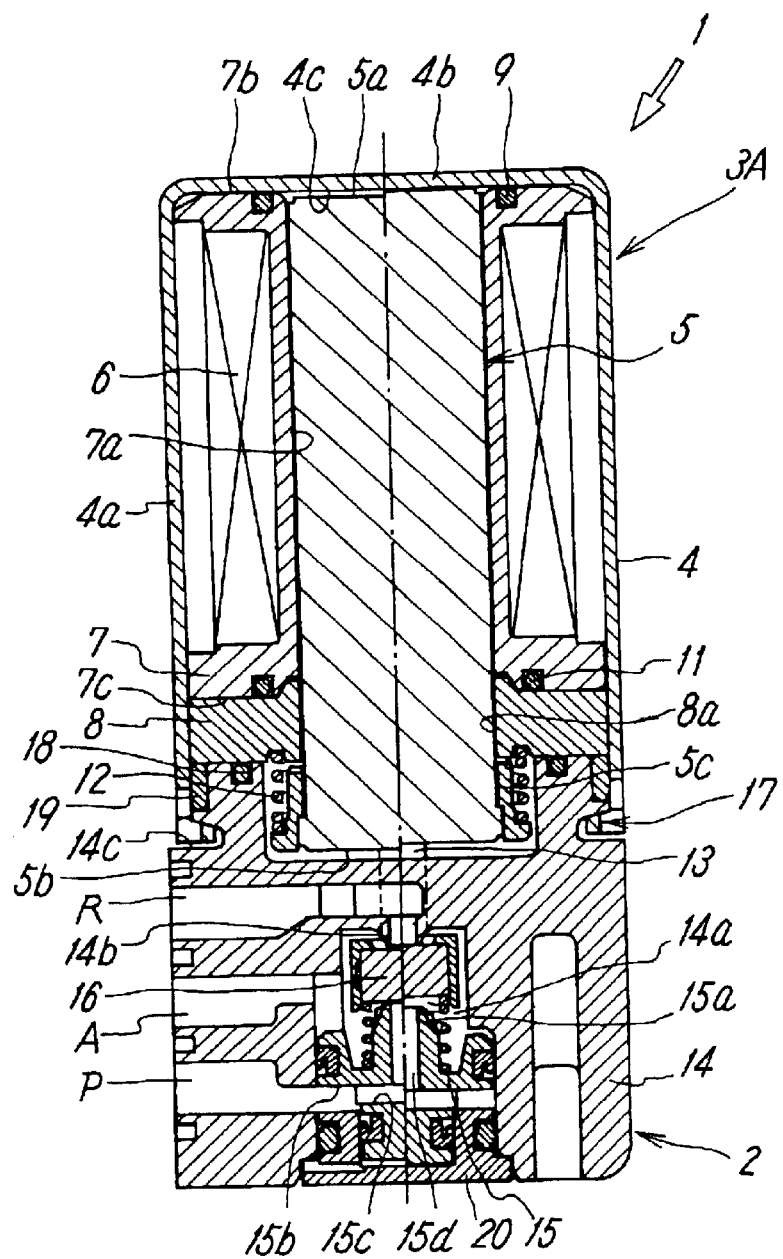
FIG. 1 is a vertical sectional view of a first embodiment of a solenoid for a solenoid valve mounted of the present invention mounted to a solenoid valve, a left half of FIG. 1 shows a non-energizing state of the solenoid and a right half thereof shows an energizing state of the solenoid.

FIG. 1 shows a first embodiment in which a solenoid valve solenoid is applied to a three-port valve. This solenoid valve 1 includes a valve portion 2 in which a channel-switching valve member 16 is embedded, and the solenoid 3A for driving the valve member 16.

The solenoid 3A includes a magnetic case 4. The magnetic case 4 is of cylindrical shape whose one end in its axial direction is opened. The magnetic case 4 includes a side wall portion 4a having substantially rectangular cross section, and a flat end wall portion 4b for closing the axially one end of the side wall portion 4a. These side wall portion 4a and end wall portion 4b are integrally formed together, and have uniform thickness as a whole, and an end of the valve body 14 of the valve portion 2 is fitted to the opened end of the magnetic case 4. A non-magnetic bobbin 7 and an annular magnetic plate 8 are provided in the magnetic case 4. The non-magnetic bobbin 7 has a center hole 7a extending in the axial direction and a coil 6 is wound around an outer periphery of the non-magnetic bobbin 7. The magnetic plate 8 is connected and fixed to an inner surface of the magnetic case 4 in a state in which the magnetic plate 8 is in abutment against a second end surface of the bobbin 7c. A moving core 5 is movably accommodated in the coaxially connected center holes 7a and 8a of the bobbin 7 and the magnetic plate 8. Therefore, these center holes 7a and 8a form a core hole for accommodating the moving core 5.

The center holes 7a and 8a of the bobbin 7 and the magnetic plate 8 and the moving core 5 have ellipsoidal cross sections. Concept of the ellipse includes an oval shape and a shape obtained by dividing a circle into two from its center and pulling them in the lateral direction. The end wall portion 4b of the magnetic case 4 also functions as the stationary core, and a portion of the flat inner surface of the end wall portion 4b covering the center hole 7a of the bobbin 7 is formed with a pole face 4c for adsorbing the moving core 5. With this, the magnetic case 4, the magnetic plate 8 and the moving core 5 form a magnetic path surrounding the bobbin 7 around which the coil 6 is wound.

The structure of the solenoid 3A will be explained in more detail. A first end surface 7b of axially one end of the bobbin 7 accommodated in the magnetic case 4 abuts against the pole face 4c of the inner surface of the end wall portion 4b through a seal material 9 which surrounds the center hole 7a of the bobbin, and the first end surface 7b of the bobbin 7 is covered with the end wall portion 4b. The entire side surface outer periphery of the coil 6 wound around the bobbin 7 is covered with the side wall portion 4a of the magnetic case 4. However, the side wall portion 4a need not have a complete rectangular cross section, and the cross section may have other shape such as a U-shape whose one side surface, out of four side surfaces, is removed. The magnetic plate 8 is disposed on a second end surface 7c on the other end of the bobbin 7 in the axial direction through a seal material 11 disposed around the center hole 7a. The outer periphery portion of the magnetic plate 8 is fixed to the inner peripheral surface of the side wall portion 4a of the magnetic case 4 by means such as welding. With this, the bobbin 7 is fixed in the magnetic case 4, and a continuous core hole is formed by the center hole 7a of the bobbin 7 and the center hole 8a of the magnetic plate 8.

The moving core 5 is slidably inserted into the core hole from the side of the magnetic plate 8, a first end surface 5a on the base end side of the moving core 5 is opposed to the pole face 4c of the inner surface of the end wall portion 4b such that the first end surface 5a can move toward and away from the pole face 4c. A second end surface 5b on the tip end side of the moving core 5 projects from the core hole. That is, the moving core 5 passes through the center holes 7a and 8a and overlaps the entire region of the coil 6, the first end surface 5a comes in the vicinity of the end wall portion 4b, the opposite side second end surface 5b extends from the center holes 7a and 8a, and a cap 5c is fitted to an outer periphery of the second end surface 5b. This cap 5c constitutes a spring washer, and a return spring 12 is interposed between the cap 5c and the magnetic plate 8. When the moving core 5 is adsorbed by the pole face 4c if the cap 5c abuts against the magnetic plate 8, the cap 5c can function as a stopper at the time of adsorption of the moving core. When the adsorption is canceled by the pole face 4c, the moving core 5 moves away from the pole face 4c by biasing force of the return spring 12, the moving core 5 is returned toward a port of the magnetic case 4, i.e., toward the valve portion 2.

In the solenoid 3A having the above structure, when the coil 6 is in non-energized state, since the moving core 5 is not adsorbed by the pole face 4c, the moving core 5 is moved forward by the biasing force of the return spring 12, and comes at a position away from the pole face 4c as shown in the left half in FIG. 1, i.e., a position where the cap 5c is separated from the magnetic plate 8, the second end surface 5b abuts against the push rod 13 of the valve portion 2 and pushes the same. On the other hand, if the coil 6 is energized, as shown in the right half in FIG. 1, the moving core 5 is adsorbed by the pole face 4c against the biasing force of the return spring 12, and moves in a direction in which the pushing operation of the push rod 13 is released. When the moving core 5 is adsorbed by the pole face 4c, the cap 5c abuts against the magnetic plate 8 simultaneously, and the moving core 5 stops.

Next, the valve portion 2 will be explained in detail based on FIG. 1. The valve portion 2 includes the above-described valve body 14. The valve body 14 includes an input port P, an output port A, a discharge port R and a valve chamber 14a which is in communication with these ports. One end of the valve chamber 14a is closed with an end block 20. A movable orifice member 15 whose one portion is supported by the end block 20, and the above-described poppet-type valve member 16 which opens and closes a supply valve seat 15a on the orifice member 15 are disposed in the valve chamber 14a. A tip end of the push rod 13 abuts against the valve member 16.

The orifice member 15 includes the supply valve seat 15a which is opened into the valve chamber 14a, a conduit line 15d which brings the supply valve seat 15a and the input port P into communication with each other, a first pressure receiving surface 15b and a second pressure receiving surface 15c. Fluid pressure from the input port P is applied to a direction of the valve member 16 and in the opposite direction on the first and second pressure receiving surfaces 15b and 15c. The orifice member 15 is slidably accommodated in the valve chamber 14a in its axial direction, i.e., in a direction approaching and separating from the supply valve seat 15a and the valve member 16. The first pressure receiving surface 15b has greater pressure receiving area than that of the second pressure receiving surface 15c against which the fluid pressure is applied in the opposite direction. The orifice member 15 can move between a position approaching the valve member 16 and a position separating from the valve member 16 by the fluid pressure applied to the first pressure receiving surface 15b.

The valve member 16 is movably disposed between the supply valve seat 15a and a discharge valve seat 14b which brings the discharge port R and the valve chamber 14a into communication with each other. The valve member 16 opens and closes both the valve seats by operation of the solenoid 3A.

The valve portion 2 and the solenoid 3A are tightly connected to each other through seal materials 18 and 19 by swaging a swaging portion 17 provided on a periphery of a port of the magnetic case 4 into a groove 14c formed in the valve body 14 of the valve portion 2.

In the solenoid valve 1 having such a structure, when the solenoid 3A is in its non-energized state, the moving core 5 pushes the valve member 16 against the supply valve seat 15a of the movable orifice member 15 through the push rod 13 as shown in the left half in FIG. 1, thereby closing the supply valve seat 15a and opening the discharge valve seat 14b at the same time. Thus, the output port A is brought into communication with the discharge port R through the valve chamber 14a and the discharge valve seat 14b, and pressures in the output port A and the valve chamber 14a become equal to atmospheric pressure. When fluid pressure supplied from the input port P is applied to both the pressure receiving surfaces 15b and 15c of the conduit line 15d, the movable orifice member 15 moves toward the valve member 16 by pressure difference of the surfaces 15b and 15c, thereby pushing the supply valve seat 15a against the valve member 16. That is, since the valve member 16 and the movable orifice member 15 are pushed in a direction in which they abut against each other, the supply valve seat 15a is moved toward the valve member 16 so that a stroke of the moving core when it is energized next time becomes small.

On the other hand, if the solenoid 2 is energized, as shown in the right half in FIG. 1, pushing action of the moving core 5 and the push rod 13 by the valve member 16 is released, the valve member 16 releases the supply valve seat 15a, and the discharge valve seat 14b is closed. With this operation, connection between the discharge port R and the valve chamber 14a is cut off, the output port A is brought into communication with the input port P through the valve chamber 14a, and the pressure of the valve chamber 14a rises at the same time. Therefore, the movable orifice member 15 is pushed back in a direction away from the valve member 16, and the supply valve seat 15a is opened more widely.

Since the solenoid 3 allows the end wall portion 4b of the magnetic case 4 to also function as the stationary core, it is unnecessary to specially provide the stationary core unlike the conventional solenoid, and it is possible to easily form the solenoid with the small number of members.

A shape of cross section of the side wall portion 4a of the magnetic case 4 in this embodiment is not limited to substantially the rectangular, and various shapes such as ellipse including oval may be employed if necessary. Shapes of the center holes 7a and 8a of the bobbin 7 and the magnetic plate 8 and a shape of cross section of the moving core 5 are not limited to the ellipse, and may be circular.

Figure 2:
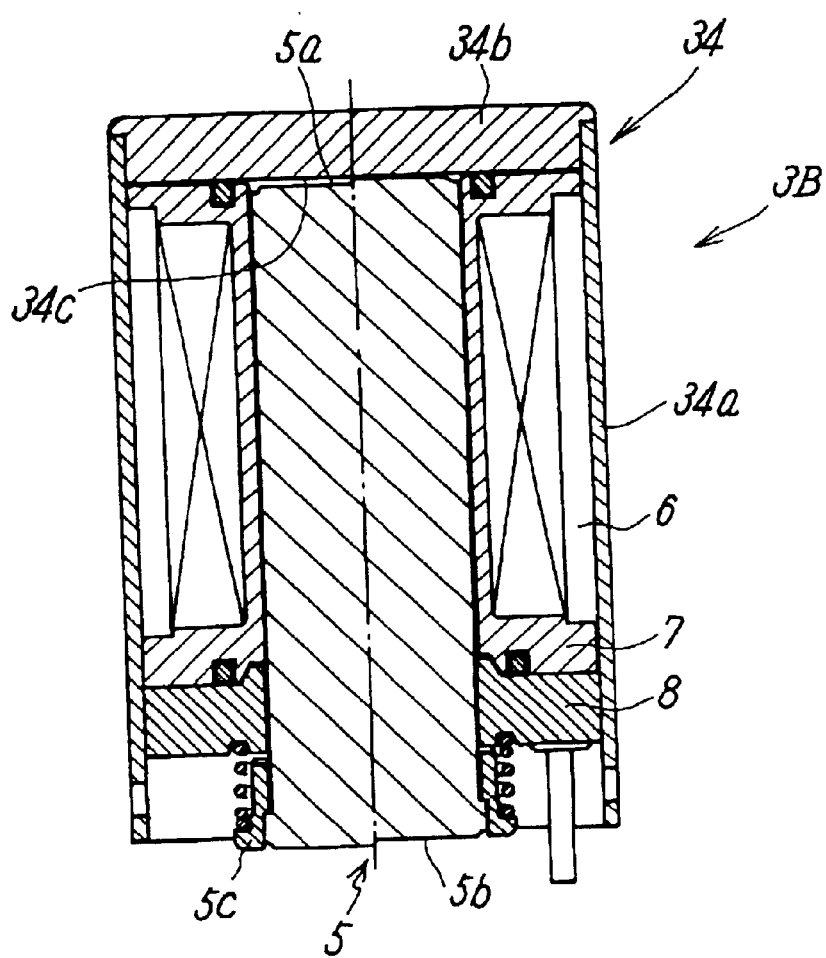
FIG. 2 is a vertical sectional view of a second embodiment of a solenoid for a solenoid valve mounted of the present invention mounted to a solenoid valve, a left half of FIG. 2 shows a non-energizing state of the solenoid and a right half thereof shows an energizing state of the solenoid.

FIG. 2 shows a second embodiment of the present invention only based on a solenoid for a solenoid valve. In this solenoid 3B, a side wall portion 34a surrounding a side surface outer periphery of the bobbin 7 around which the coil 6 is wound, and an end wall portion 34b covering the first end surface 7b of the bobbin 7 are separately formed, and they are integrally coupled to each other by means of welding, thereby forming a magnetic case 34. A thickness of the end wall portion 34b is set greater than that of the side wall portion 34a. When the side wall portion 34a and the end wall portion 34b are separately formed in this manner, since the thickness of the end wall portion 34b can be set to arbitrary value, it is easy to form a magnetic path. The side wall portion 34a and the end wall portion 34b may have the same thickness.

Since other structure and action of the second embodiment are the same as those of the first embodiment, the same major constituent elements as those in the first embodiment are designated with the same symbols, and explanation thereof is omitted.

Figure 3:
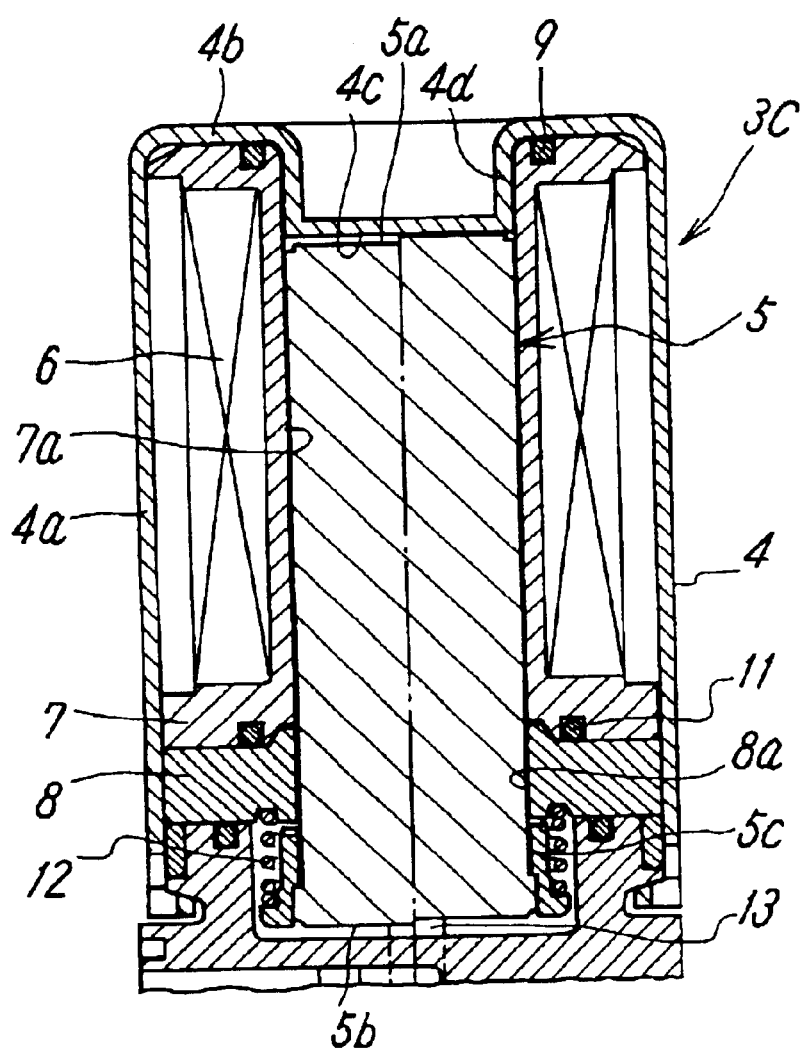
FIG. 3 is a vertical sectional view of an essential portion of a third embodiment of a solenoid for a solenoid valve of the invention.
Figure 4:
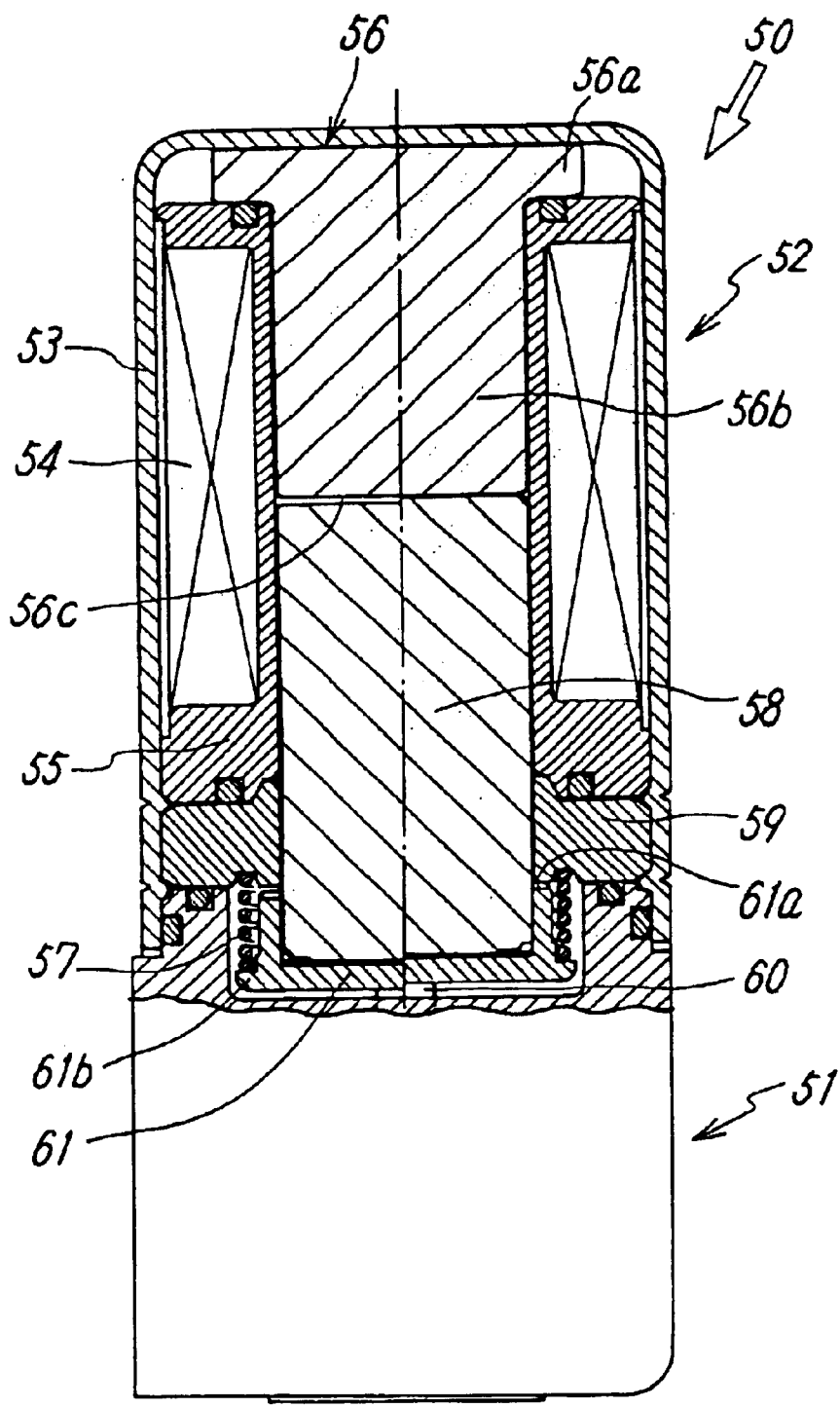
FIG. 4 is a partial vertical sectional view of a conventional solenoid valve, a left half of FIG. 4 shows a non-energizing state of the solenoid and a right half thereof shows an energizing state of the solenoid.

FIG. 3 shows a third embodiment of the present invention only based on a solenoid for a solenoid valve. A solenoid 3C in this third embodiment is different from that of the first embodiment in that a portion of the end wall portion 4b of the magnetic case 4 covering the center hole 7a of the bobbin 7 is provided with a cylindrical recess 4d which is fitted into the center hole 7a, and an end surface of the recess 4d is formed with the pole face 4c. This recess 4d has the same cross section shape as that of the center hole 7a, and the recess 4d is formed into such size that the recess 4d is tightly fitted to the center hole 7a. By providing the end wall portion 4b with such a recess 4d, it is possible to smoothen the flow of a magnetic flux between the end wall portion 4b and the moving core collectively to enhance the magnetic adsorbing force, or to stabilize the mounting state between the magnetic case 4 and the bobbin 7.

Even in the magnetic case 34 in which the side wall portion 34a and the end wall portion 34b are separately formed as in the second embodiment, it is possible to provide the end wall portion 34b with such a recess.

Since other structure and action of the third embodiment are the same as those of the first embodiment, the same major constituent elements as those in the first embodiment are designated with the same symbols, and explanation thereof is omitted.

What is claimed is:

1. A solenoid for a solenoid valve mounted to a solenoid valve for driving a channel-switching valve member, said solenoid comprising:
   a non-magnetic bobbin having a center hole extending in an axial direction of the bobbin and wound around an outer periphery;
   a magnetic case having a side wall portion covering a side surface of the bobbin and an end wall portion formed on one end of the side wall portion and covering one end surface of the bobbin in the axial direction;
   an annular magnetic plate having a center hole coaxially connected to the center hole of said bobbin and connected to the magnetic case on the side of the other end surface of the bobbin; and
   a moving core movably accommodated in the bobbin and the center hole of the magnetic plate, wherein
      the end wall portion of the magnetic case acts as a stationary core, a portion of the end wall portion covering the center hole of the bobbin is provided with a pole face for adsorbing the moving core, and wherein the side wall portion and the end wall portion of the magnetic case are integrally formed and have uniform thickness as a whole.

2. A solenoid for a solenoid valve according to claim 1, wherein an inner surface of the end wall portion of the magnetic case covering one end surface of the bobbin in the axial direction is flat as a whole.

3. A solenoid for a solenoid valve according to claim 1, wherein the portion of the end wall portion of the magnetic case covering the center hole of the bobbin is provided with a cylindrical recess which is fitted into the center hole.

4. A solenoid for a solenoid valve mounted to a solenoid valve for driving a channel-switching valve member, said solenoid comprising:
   a non-magnetic bobbin having a center hole extending in an axial direction of the bobbin and wound around an outer periphery;

a magnetic case having a side wall portion covering a side surface of the bobbin and an end wall portion formed on one end of the side wall portion and covering one end surface of the bobbin in the axial direction;

an annular magnetic plate having a center hole coaxially connected to the center hole of said bobbin and connected to the magnetic case on the side of the other end surface of the bobbin; and a moving core movably accommodated in the bobbin and the center hole of the magnetic plate, wherein the end wall portion of the magnetic case acts as a stationary core, a portion of the end wall portion covering the center hole of the bobbin is provided with a pole face for adsorbing the moving core, and an inner surface of the end wall portion of the magnetic case covering one end surface of the bobbin in the axial direction is flat as a whole.

5. A solenoid for a solenoid valve according to claim 4, wherein the side wall portion and the end wall portion of the magnetic case are separately formed, and a thickness of the end wall portion is greater than that of the side wall portion.

* * * * *